US010737451B2

(12) United States Patent
 Pan

(10) Patent No.: US 10,737,451 B2
(45) Date of Patent: Aug. 11, 2020

(54) METHODS AND APPARATUS FOR FORMING TREAD STRIPS IN CLOSED-LOOP SYSTEM

(71) Applicant: Chinglin Pan, Mauldin, SC (US)

(72) Inventor: Chinglin Pan, Mauldin, SC (US)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 357 days.

(21) Appl. No.: 15/538,984

(22) PCT Filed: Dec. 31, 2014

(86) PCT No.: PCT/US2014/072987
§ 371 (c)(1),
(2) Date: Jun. 22, 2017

(87) PCT Pub. No.: WO2016/108884
PCT Pub. Date: Jul. 7, 2016

(65) Prior Publication Data
US 2018/0009182 A1    Jan. 11, 2018

(51) Int. Cl.
*B29D 30/00*    (2006.01)
*B29D 30/68*    (2006.01)
(Continued)

(52) U.S. Cl.
CPC .......... *B29D 30/0016* (2013.01); *B29C 35/02* (2013.01); *B29C 35/0277* (2013.01);
(Continued)

(58) Field of Classification Search
CPC ............ B29D 30/0016; B29D 30/0662; B29D 30/0603; B29D 30/0606; B29D 30/52;
(Continued)

(56) References Cited

U.S. PATENT DOCUMENTS 2,404,449 A * 7/1946 McChesney ........... B29D 30/28
156/367
2,797,111 A * 6/1957 Beazley .............. F16L 33/2078
285/222.4
(Continued)

FOREIGN PATENT DOCUMENTS

DE   102010020060 A1 * 11/2011 ............. B29C 31/08
DE   102010020060 A1    11/2011
WO     02096630 A1    12/2002

OTHER PUBLICATIONS

PCT/US2014/072987 International Search Report and Written Opinion dated Oct. 14, 2015, 10 pages.

*Primary Examiner* — Nahida Sultana
(74) *Attorney, Agent, or Firm* — Hahn Loeser & Parks LLP; Bret A. Hrivnak

(57) ABSTRACT

Particular embodiments of the invention include a closed-loop tread strip forming unit (100) and methods for forming tread strips using a closed-loop unit. Embodiments of such forming units include a tread strip extruder (110) located at a pre-cure end of the closed-loop tread strip forming unit. Such units include an uncured tread strip handling assembly (120) configured to transport the first uncured tread strip from the first tread strip extruder and to a first tread strip mold member (130). The unit further includes a curing press (150) having an inlet and an outlet, a pre-cure mold handling assembly (140) configured to insert the loaded tread strip mold member into the curing press, a post-cure mold handling assembly (160) configured to receive the loaded tread strip mold member from the outlet of the curing press, a return assembly (170) configured to transfer the first tread strip mold member to the pre-cure end to complete a closed-loop.

20 Claims, 10 Drawing Sheets

(51) Int. Cl.
*B29C 48/07* (2019.01)
*B29C 48/00* (2019.01)
*B29D 30/52* (2006.01)
*B29D 30/06* (2006.01)
*B29C 35/02* (2006.01)
*B29C 48/91* (2019.01)
*B29C 33/44* (2006.01)

(52) U.S. Cl.
CPC ...... *B29C 48/0011* (2019.02); *B29C 48/0022* (2019.02); *B29C 48/07* (2019.02); *B29C 48/91* (2019.02); *B29D 30/0603* (2013.01); *B29D 30/0606* (2013.01); *B29D 30/0662* (2013.01); *B29D 30/52* (2013.01); *B29D 30/68* (2013.01); *B29C 33/44* (2013.01); *B29D 2030/0038* (2013.01)

(58) Field of Classification Search
CPC ............ B29D 30/68; B29D 2030/0038; B29C 48/91; B29C 35/0277; B29C 35/02; B29C 48/0022; B29C 48/0011; B29C 48/07; B29C 33/44
See application file for complete search history.

(56) References Cited

U.S. PATENT DOCUMENTS

| | | | | |
|---|---|---|---|---|
| 3,201,020 | A * | 8/1965 | Michaels | G03B 1/56 226/91 |
| 3,538,584 | A * | 11/1970 | Carpenter | B65B 13/34 29/56.6 |
| 4,285,654 | A * | 8/1981 | Bohm | B29D 30/52 425/327 |
| 2019/0329474 | A1 * | 10/2019 | Para | B29D 30/00 |

* cited by examiner

METHODS AND APPARATUS FOR FORMING TREAD STRIPS IN CLOSED-LOOP SYSTEM

BACKGROUND OF THE INVENTION

Field of the Invention

This invention relates generally to methods and systems for producing tire treads, and more specifically, closed-loop tread forming systems and related methods for forming tire treads.

Description of the Related Art

While tire treads become damaged or worn through use, much of a tire remains functional after the tread portion is unserviceable. To save on replacement costs and avoid waste, tire retreading technology applies new treads to used tires to extend the service life of non-tread portions (e.g., the tire carcass). Accordingly, tread strips used for retreading tire carcasses are produced independent of other tire components.

As in many manufacturing settings, some tread strip production procedures are only cost effective through mass production. In these situations, the dramatic cost of equipment for tread strip forming, molding, curing, cutting, et cetera, is offset through a large production scale. Setup of such facilities requires a huge initial capital investment and lengthy lead time in a carefully selected geographic location, limiting the ability to establish retread manufacturing in many areas.

The large investment and lead time impact developing markets and test production settings where voluminous manufacturing is not desired. In emerging markets or with new product lines, businesses may seek to utilize smaller production scales to test products and markets. The production scales may thereafter be ramped up once the product design and its manufacture is refined or when the market grows (e.g., for a specific product or in a specific geographic area). Large-scale, traditional retread production facilities, however, are not well configured to provide the flexibility desired for such circumstances.

SUMMARY OF THE INVENTION

Embodiments of the invention include a closed-loop tread strip forming unit. In particular embodiments, the closed-loop tread strip forming unit comprises a first tread strip extruder configured to extrude a first uncured tread strip having a length extending between a first tread strip end and a second tread strip end, the first tread strip extruder located at a pre-cure end of the closed-loop tread strip forming unit. The closed-loop unit further includes an uncured tread strip handling assembly configured to transport the first uncured tread strip from the first tread strip extruder and to a first tread strip mold member, and a curing press having a pair of opposing platens, the pair of opposing platens displaceable between open and closed arrangements. The curing press includes an inlet configured to receive the first tread strip mold member with the first uncured tread strip and an outlet configured to discharge the first tread strip mold member with a first cured tread strip produced from the first uncured tread strip using a curing process within the curing press. The closed-loop unit further includes a pre-cure mold handling assembly configured to both receive the first tread strip mold member containing the first uncured tread strip from the uncured tread strip handling assembly and insert the first tread strip mold member containing the first uncured tread strip into the curing press through the inlet and between the pair of opposing platens. The closed-loop unit further includes a post-cure mold handling assembly configured to receive the first tread strip mold member from the outlet of the curing press, the first tread strip mold member containing the first uncured tread strip in a cured state, the post-cure mold handling assembly configured to transfer the first tread strip mold member with the first cured tread strip to a return assembly configured to transfer the first tread strip mold member from the post-cure end to the pre-cure end to form a closed-loop about the closed-loop tread strip forming unit. The closed-loop unit also includes a tread strip demolding device configured to remove the first cured tread strip from the first tread strip mold member unloaded from the curing press.

Embodiments of the invention comprise a method for forming tire tread strips using a closed-loop tread strip forming unit. In particular embodiments the method comprises the step of extruding an uncured tread strip using an extruder, the uncured tread strip having a length extending between a first tread strip end and a second tread strip end, where the extruding occurs at a pre-cure end of the closed-loop tread strip forming unit. Further steps include transporting the uncured tread strip to a tread strip mold member contained within the closed-loop tread strip forming unit, arranging the uncured tread strip along the tread strip mold member to form a loaded tread mold member, and inserting the loaded tread strip mold member into a curing press contained within the closed-loop tread strip forming unit through an inlet of the curing press, the curing press having at least a pair of opposing platens. Additional steps include articulating at least one platen of the curing press to close the curing press with the tread strip mold member aligned between the pair of opposing platens, curing the uncured tread strip in the tread strip mold member to provide a cured tread strip, and discharging the loaded tread strip mold member from the curing press through an outlet of the curing press. Further steps include transferring the loaded tread strip mold member including the cured tread strip to a return assembly contained within the closed-loop tread strip forming unit, demolding the cured tread strip from the loaded tread mold member subsequent to the step of discharging, and conveying the tread strip mold member to the pre-cure end after the tread strip has been demolded.

The foregoing and other objects, features, and advantages of the invention will be apparent from the following more detailed descriptions of particular embodiments of the invention, as illustrated in the accompanying drawings wherein like reference numbers represent like parts of the invention.

DETAILED DESCRIPTION OF THE DRAWINGS

DETAILED DESCRIPTION OF PARTICULAR EMBODIMENTS

Figure 1:
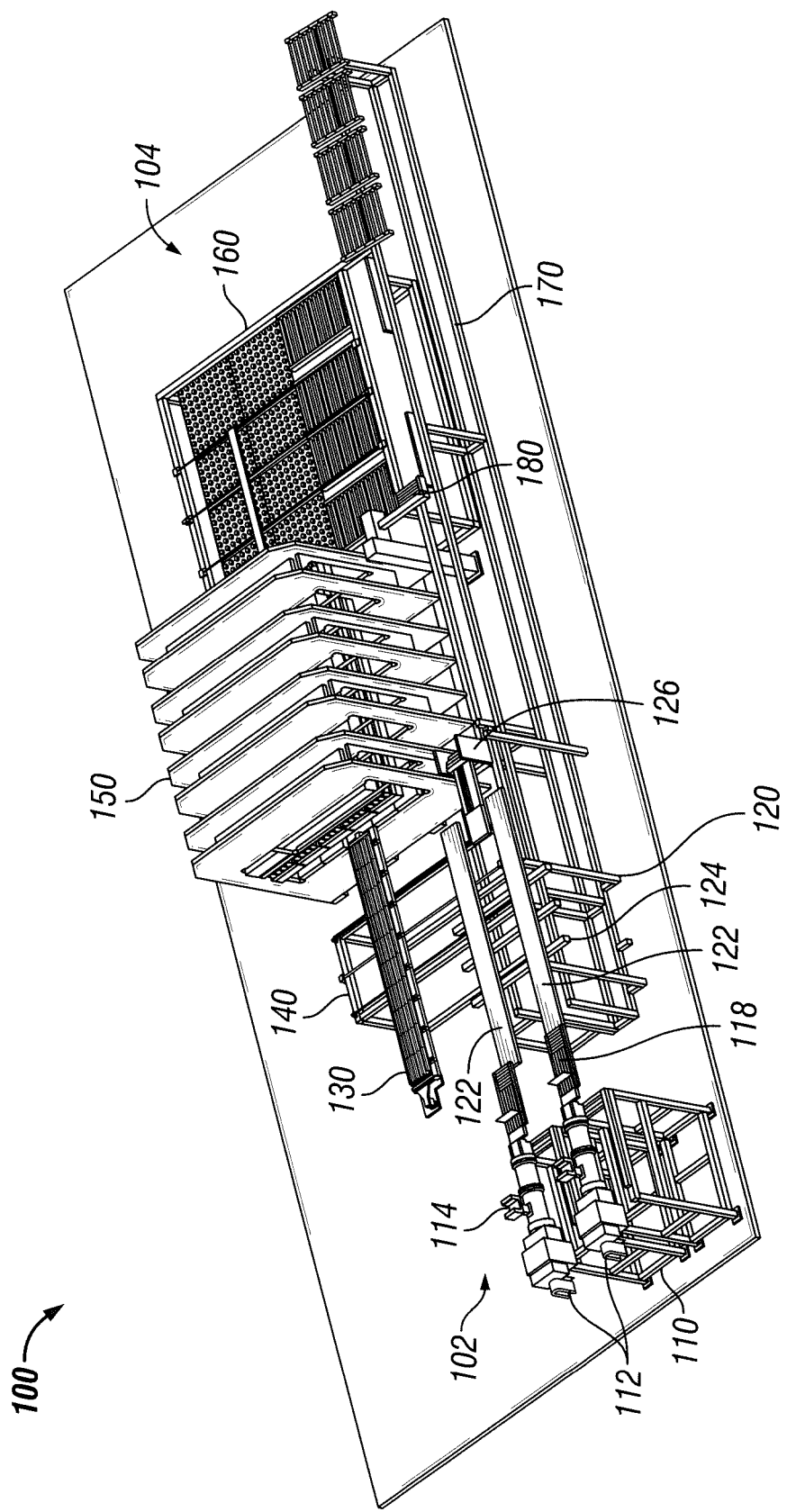
FIG. 1 is a perspective view of a closed-loop tread strip forming unit, in accordance with an embodiment of the invention.

Embodiments of the invention comprise methods for efficiently producing tire retread strips and a closed-loop tire retread strip forming unit or system. The methods and units/systems can be modular, scalable, and flexible, and facilitate continuous production through closed-loop configuration.

In particular embodiments a method is provided for forming tire tread strips using a closed-loop tread strip forming unit. The method comprises extruding an uncured tread strip using an extruder. The uncured tread strip has a length extending between a first tread strip end and a second tread strip end, where the extruding occurs at a pre-cure end of the tread strip forming unit. It is appreciated that the step of extruding may be performed using any known extruder or any method of extruding polymeric material, which includes any natural or synthetic rubber. It is also appreciated that while in certain embodiments a single extruder is employed, in other embodiments multiple extruders are employed to prepare two or more tread strips to increase the production rate by making new, uncured tread strips available on demand. These on demand uncured tread strips may be retained on one or more storage members while awaiting arrangement along a tread strip mold member. In certain embodiments, any such storage member comprises a conveyor. A conveyor, as used herein, may comprise any known apparatus for transferring an intended object. For example, a conveyor may comprise an actuator, a linear actuator, a rack and pinion, a driven belt, a belt and roller system, or a plurality of rollers. whether freely rotatable or driven, or any combination thereof. Additionally, each extruded tread strip may comprise multiple treads, where a tread strip is sufficiently sized to include multiple treads. For example, each extruded tread strip may have a length comprising the sum of the lengths of multiple treads. By further example, each tread strip may have a width comprising the sum of the widths of multiple treads. The term multiple means two or more. After extruding a desired length of the tread strip, a cutting element is arranged to cut the tread strip to the desired length. The cutting element may comprise any known cutting element, including any discussed herein, which includes a bladed or wire cutter, which may be heated or operated using vibration, or a laser cutter.

It is appreciated that the tread strips need not immediately be extruded onto tread strip mold members or onto any conveyors, especially when multiple extruders are employed and a single conveyor operates to translate extruded tread strips for further processing. Therefore, in particular embodiments, such methods may include storing the uncured tread strip using a tread strip storage member prior to transporting the uncured tread strip to the tread strip mold member.

Subsequent to the step of extruding, the method includes transporting the uncured tread strip to a tread strip mold member contained within the closed-loop tread strip forming unit. Once the extruded tread strip is formed, the tread strip is ultimately arranged along a tread strip mold member for use in molding the tread during tread curing operations. It is appreciated that the step of transporting may be accomplished by employing any known manner or apparatus for transporting treads. For example, an uncured tread strip handling assembly may be employed that includes a conveyor, with may comprise any known conveyor. It is appreciated that the conveyor may form a translation path that may extend along any linear or non-linear path. For example, in particular embodiments, the translation path extends such that a portion of the path inverts elevationally, such as by bending, so to re-configure the tread from an initial elevational arrangement to an inverted elevational arrangement. Accordingly, in specific embodiments, the method includes inverting the uncured tread strip before applying the uncured tread strip to the tread strip mold member, inverting is accomplished using an inverting unit which directs the uncured tread strip around an arcuate or curved path. In this way, extrusion of the tread strip can form the side to receive the tread elements of the tread strip mold member to the air such that no deformation occurs during initial transport. Because adhesives or other materials may be applied to the carcass-side of the produced tread strip, or because buffing operations may be completed prior to applying the produced tread strip to a tire carcass, minor deformations to this side may be acceptable prior to inversion. It is also contemplated that the conveyor may comprise or include one or more lifts or elevators for changing the elevation of the uncured tread strip.

In particular embodiments, the tread strip is transported from an extruded location and to a tread strip mold member at a loading location. At the loading location, the uncured tread strip may remain in a static, stored position or the uncured tread strip may continue moving directly to an awaiting tread strip mold member such that the uncured tread strip is simultaneously arranged along the tread strip mold member to accomplish a step of arranging the uncured tread strip along the tread strip mold member.

Whether occurring after being transported to a loading location or concurrently with a the step of transporting the uncured tread strip, such methods include arranging the uncured tread strip along the tread strip mold member to form a loaded tread mold member. Arranging of the uncured tread strip occurs along a molding cavity of the tread strip mold member, where the uncured tread strip is aligned with the molding cavity. Arranging can include placing the uncured tread strip within the molding cavity. It is noted that a "loaded tread strip mold member" as used herein comprises the combination of the tread strip arranged within the tread strip mold member, whether uncured or cured after undergoing a curing operation.

Particular embodiments of such methods include a step of inserting the loaded tread strip mold member including the uncured tread strip into a curing press contained within the closed-loop tread strip forming unit through an inlet of the curing press, the curing press having at least a pair of opposing platens. The pre-cure mold handling assembly can load the tread strip mold member by any desired manner using any known apparatus. For example, pushing or pulling forces may be imparted upon the loaded tread strip mold member using a driven conveyor or one or more actuators pushing or pulling the mold member along a conveyor to a curing location within a curing press. The curing may comprise any desired press configured to impart curing forces and heat to the loaded tread mold member. For example, in particular embodiments, the press is a press manufactured by Custom Engineer Company and known as a German Window Frame Press. Such a press can be employed with no foundation or pit, and lends itself to modular, quickly assembly for closed-loop production due to its inlet/outlet configuration. The curing press may have multiple pairs of platens, more generally multiple curing compartments or cells, each independently operable. In particular embodiments, three (3) or five (5) pair of platens are provided. In more particular embodiments, multiple tread strips are molded along each pair of platens, whether along a single tread strip mold member or by arranging multiple tread strip mold members adjacently along the length of a single pair of platens. In embodiments where 2 to 3 tread strips are molded along a pair of platens, the curing press has at least a 1800 metric ton capacity and at least up to 3000 metric ton capacity.

By providing multiple pairs of platens, or more generally multiple curing compartments or cells, multiple tread strips are able to be molded and cured independently at the same or different times using the same or different curing parameters. Also, the multiple tread strips and tread strip mold members may be of the same or different design, all of which maximizes the use of the curing press. The curing press is further maximized by performing other operations outside the curing press, such as applying fabric to the uncured tread strip, cooling the mold member, and demolding the mold member.

In particular variations of such methods, after the tread strip mold member receives an extruded curing strip, in particular embodiments, the loaded tread strip mold member is transferred to a pre-cure mold handling assembly, which then loads the loaded tread strip mold member into a curing press. The step of transferring the loaded tread strip mold member to a tread mold loader may be achieved by any known manner using any known apparatus. For example, a driven conveyor or conveyor with one or more actuators are used in certain embodiments.

While tread strips may be stored until used, maintaining an elevated temperature (e.g., above ambient) in extruded tread strips can increase production speed and energy efficiency, especially when reducing the duration required for a sufficient cure (also referred to as curing time). Therefore, particular embodiments of the method may provide that the uncured tread strip is extruded in a heated state and that loading the loaded tread strip mold member including the uncured tread strip into the curing press occurs while the uncured tread strip is in the heated state. It is appreciated that a heated tread strip may be facilitated by heating the tread and/or the tread strip mold member prior to loading the tread into the curing press. This may be achieved in addition to or without extruding the tread strip in a heated state. Additionally, it is understood that the tread could cool from an extruded heated state, and later pre-heated before it is loaded into the curing press.

Once the loaded tread strip mold member is loaded into the curing press, embodiments of such methods include curing the uncured tread strip in the tread strip mold member to provide a cured tread strip. Because this step may be performed using any known press, this step of curing may be performed in any known manner using any known curing press. For example, in particular embodiments, the method includes articulating at least one platen of the curing press to close the curing press with the tread strip mold member aligned between the pair of opposing platens. In certain variations, multiple articulable platens are provided configured to provide simultaneous curing of two or more tread strips. In particular examples, three (3) or (5) pairs of platens are provided. Closing the press permits tread elements and features within the mold member cavity to be fully formed onto the tread strip, and facilitates curing the uncured tread strip in the tread strip mold member to provide a cured tread strip. Curing can include partially or wholly re-opening and closing the platens one or more times to facilitate degassing or stepwise curing of the tread strips.

As described briefly above, in configurations where the press includes multiple independently articulable platens, the method may include articulating a second platen of the curing press while the at least one platen is in a closed configuration, a second tread strip mold member including a second uncured tread band is aligned with the second platen in the curing press prior to articulating at least the second platen. In this way, multiple mold members having multiple tread strips can be cured simultaneously or in a continuous fashion without losing the flexibility of single tread strip production. This also increases the ease of producing multiple tread strip variants during the same production period in association with different pairs of platens using the same or different curing parameters (e.g., time, temperature, pressure) to maintain efficient tread strip production. Multiple platen embodiments can be non-synchronous, and/or limit movement to a single platen at any given time. In embodiments where only a single platen moves at a given time, planning algorithms employed by a controller can determine when to begin curing operations to deconflict scheduled motion of platens.

Once the tread strip has been formed and cured in accordance with the parameters, the method further comprises discharging the loaded tread strip mold member from the curing press through an outlet of the curing press and then transferring the loaded tread strip mold member including the cured tread strip to a return assembly contained within the closed-loop tread strip forming unit. The step of transferring occurs at a post-cure end of the closed-loop tread strip forming unit. Discharging or unloading can be accomplished by any known manner using any known apparatus. For example, in particular embodiments, any driven conveyor or actuator is configured to pull or push the tread strip mold from the press is employed to do the same. Pulling the tread strip mold member through the press outlet, for example, may be accomplished from the outlet side. By further example, pushing of the tread strip mold member through the outlet may be accomplished from the inlet side. Transferring the tread strip mold member with the cured tread strip from the press can be achieved in any known manner using any known apparatus, such as using a post-cure handling assembly in particular embodiments. A post-cure handling assembly, in different embodiments, includes a conveyor comprising any known conveyor, such as an actuator alone or in cooperation with one or more rollers, ball bearings, or a belt or one or more tracks configured to translate the tread strip mold member after unloading. The post-cure handling assembly can facilitate cooling by facilitating contact or airflow around the tread strip mold member.

To collect the finished product and re-deploy the reusable tread strip mold member, embodiments of such methods include demolding the cured tread strip from the loaded tread mold member subsequent to the step of discharging. Demolding may be accomplished by any known manner using any known apparatus. In particular embodiments, demolding is accomplished using a demolding device which applies a force opposite the tread strip mold member's direction of travel in a closed-loop tread strip forming unit. The demolding device can be configured to demold a variety of tread types, including those having complex tread patterns. The loaded tread strip mold member is thus converted to its original, unloaded configuration, and a cured and formed tread strip is produced. The method also includes conveying the tread strip mold member without any tread strip back to the pre-cure end using the return assembly, to thereby complete redeployment of the tread strip mold member and close the closed-loop system. The conveying places the tread strip mold member on a pre-cure end of the closed-loop tread strip forming unit in the vicinity of the extruder(s) and/or uncured tread strip handling assembly.

Another aspect of particular embodiments of methods disclosed herein includes cutting the cured tread strip into a plurality of tire treads. In this fashion, a single mold can be used to create multiple retread products after molding, pressing, and curing a larger extruded tread strip. However, in alternative embodiments, the mold is sized for a single retread strip. In particular embodiments, with respect to removing the completed tread strip from the mold, the tread mold member is located along the return assembly during demolding. In alternative or complementary embodiments, other components or locations (e.g., a post-cure handling assembly) can include at least one demolding device to perform demolding at different sites simultaneously or in lieu of demolding on the return conveyor.

Various steps from the above methods can be automated. Controllers, robots, or other devices can be leveraged to permit the methods to be performed without human interaction.

Particular embodiments of a closed-loop tread strip forming unit related to methods discussed above will now be described in further detail below in association with the figures filed herewith providing exemplary embodiments of the closed-loop tread strip forming unit components and the performance of the methods.

With reference to an exemplary embodiment shown in FIGS. 1-8, a closed-loop tread strip forming unit 100 is shown. In FIG. 1, the closed-loop tread strip forming unit 100 to include a pre-cure end (or portion) 102 and a post-cure end (or portion) 104, between which a curing press 150 is arranged. The pre-cure end 102 includes an extruder assembly 110 communicatively operative with an uncured tread strip handling assembly 120, and a a pre-cure mold handling assembly 140 configured to load a tread strip mold member 130 loaded with an uncured tread strip into curing press 150. The post-cure end 104 includes a post-cure handling assembly 160 for handling a tread strip mold member 130 containing a cured tread strip. A return assembly 170 receives tread strip mold member 130 loaded with a cured tread strip from post-cure handling assembly 160 at post-cure end 104, which subsequently conveys mold member 130 to tread strip demolding device 180. A tread strip demolding device 180 proceeds to demold a cured tread strip from the tread strip mold member 130. After the cured tread strip is removed, the empty tread strip mold member 130 returns to pre-cure end 102 by way of return assembly 170 to the uncured tread strip handling assembly 120 to facilitate re-use of mold member 130 to complete the closed-loop system. The closed-loop tread strip forming unit 100 may be manually operated or at least partially automated using a programmable logic controller in cooperation with a memory storage device containing executable instructions for performing any of the methods described herein.

Figure 2:
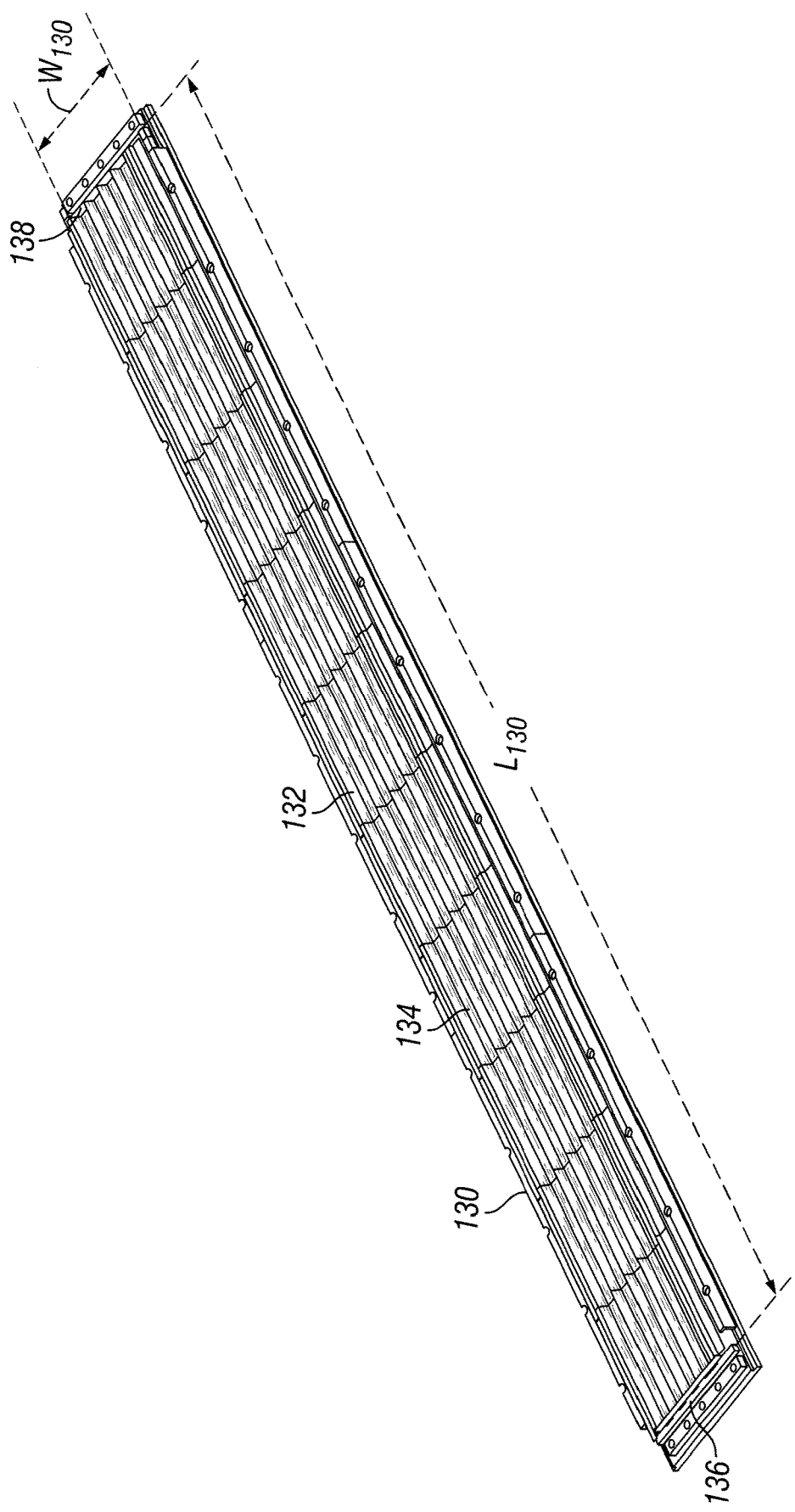
FIG. 2 is a perspective view of a tread strip mold member for use in the closed-loop tread strip forming unit of FIG. 1, in accordance with an exemplary embodiment of the invention.

FIG. 2 illustrates an exemplary embodiment of a tread strip mold member 130. Any known tread strip mold member for use in molding a tread strip may be used with closed-loop tread forming unit 100. In the exemplary embodiment shown, tread strip mold member 130 has a molding cavity 132 containing molding elements 134 each configured to mold a tread void feature into a tread strip. Mold member 130 has a length $L_{130}$ defined between two terminal ends of the mold member and a width $W_{130}$ extending transverse to the length $L_{130}$ defined by opposing lateral sides, where the width is less than the length. Mold member 130 can include one or more integrated cutting members configured to cut an uncured tread strip to a more precise length or width of the molding cavity 132. In the embodiment shown, mold member 130 includes a pair of integrated cutting elements 136 and 138 each arranged along one of the pair of opposing terminal ends of the mold member defining the length of the molding cavity. A cutting element comprise any cutting element contemplated herein and in association with cutting element 116. In alternative or complementary embodiments one or more additional cutting members can be located at any point along the length or width of tread strip mold member 130, whether to assist cutting elements 136, 138 in shaping a single tread strip within the tread strip mold member 130 or to form two or more separate tread strips within tread strip mold member. Cutting elements 136 and 138 may cut a tread strip, for example, when closing a tread strip mold with mold member 130, such as when the mold member contacts a platen (that is, a generally flat plate) or one or more opposing mold members which may contain a molding cavity and/or one or more molding members.

The exemplary closed-loop unit 100 utilizes a plurality of tread strip mold members 130 simultaneously, where the plurality of tread strip mold members may be of the same or different design. In the exemplary embodiment best shown in FIGS. 1 and 6, because the curing press 150 includes five (5) mold member-receiving members 156 each comprising a platen and configured to receive at least one tread strip mold member 130, and because one or more tread strip mold members are being processed while at least a portion of the mold member-receiving members are being used to cure a tire tread strip, at least five mold members are begin employed simultaneously and even six or more mold members may be employed by the exemplary closed-loop tread forming unit 100. More generally, each of the mold member-receiving members 156 define a separate curing compartment or cell of the curing press 150, and it is appreciated that an equal quantity of mold members 156 may be used in the closed-loop tread forming system 100, or a quantity of mold members greater than the total separate curing compartments or cell contained in the curing press. In the exemplary embodiment shown, the curing press 150 includes multiple independently articulable lower platens 156 arranged side-by-side in a direction transverse to a direction extending between the inlet 152 and outlet 154 of the curing press, such that multiple independent tread strip mold members 130 can be cured simultaneously or in a staggered fashion permitting the concurrent production of different tread strip designs requiring different tread strip mold member designs.

Figure 3:
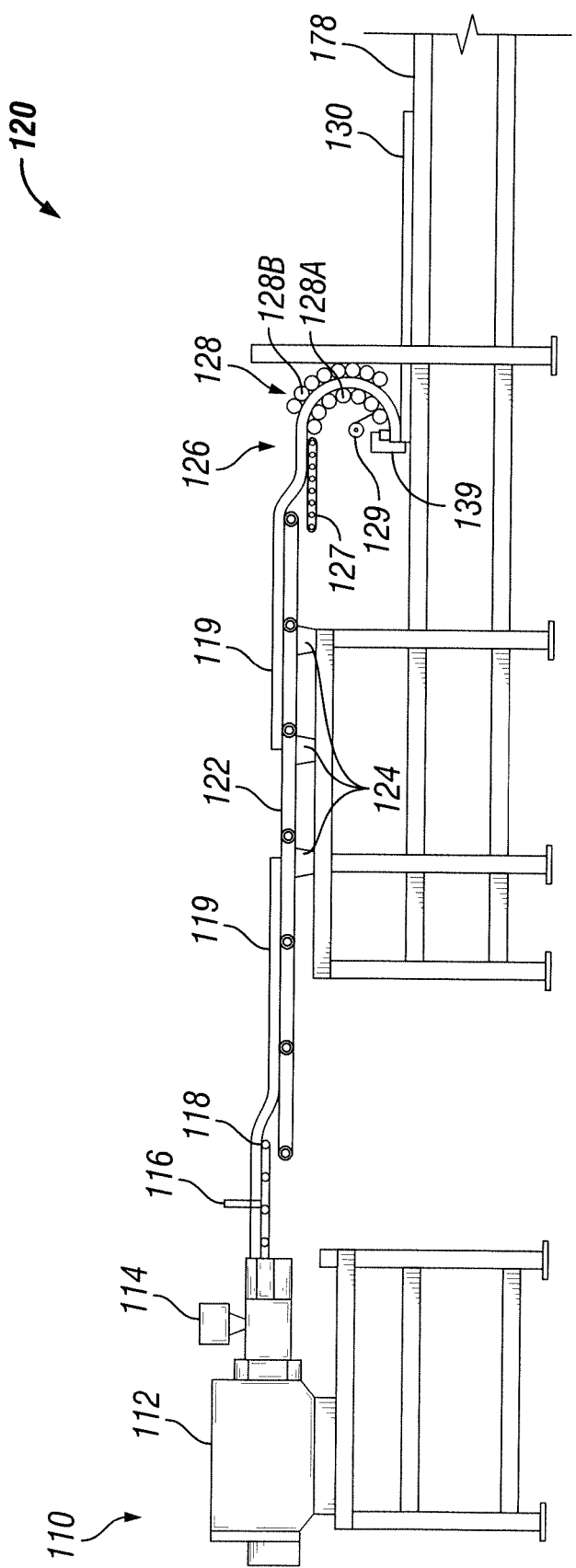
FIG. 3 is a side view of an extruding assembly and an uncured tread strip handling assembly of the closed-loop tread strip forming unit of FIG. 1, in accordance with an exemplary embodiment of the invention.

FIG. 3 depicts an extruder assembly 110 and in operable communication with a tread strip handling 120 located at a pre-cure end 102 of the closed-loop tread strip forming unit 100. Extruder assembly 110 includes at least one extruder 112, and more specifically a first and a second extruder 112. Each tread strip extruder is configured to extrude an uncured tread strip 119 having a length extending between a first tread strip end and a second tread strip end. Accordingly, the first and second extruders are configured to form a first and second uncured tread strip, respectively. Each extruder 112 includes an extruder feeder 114 which permits the introduction of additional tread strip material for extrusion. In embodiments, extruder feeder is loaded with recycled tread strip material trimmed from tread strip mold member 130.

In particular embodiments, an extruder is configured to extrude a heated tread strip. A heated tread strip comprises any tread strip having a temperature above ambient temperature. In particular embodiments, as best shown in FIG. 1, uncured tread strip handling assembly 120 and the pre-cure mold handling assembly 140 are configured such that the uncured tread strip is inserted into the curing press 150 while in a heated state. In embodiments, other heating elements can be integrated to maintain or generate elevated temperatures in tread strips until they are loaded into curing press 150. For example, as best shown in FIG. 1, a heating unit can be integrated anywhere along the pre-cure end 102 between an extruder 112 and the curing press 150.

With reference again to FIG. 3, a cutting element 116 is arranged near the outlet of each extruder 112 configured to cut an extruded tread strip from the extruder, for ultimate transfer to a tread strip mold member. Cutting elements 116 may be provided in addition to, or in lieu of, cutting elements 136 and 138 within tread strip mold member 130 (see FIG. 3). Cutting elements 116 are located beyond extruder 112 outlet and along an extrusion conveyor 118, and may be controlled manually or by automation. Cutting elements 116 may comprise any known cutting element, which may facilitate a cut using a sufficiently sharp edge, heat, and/or vibration, for example. Extrusion conveyor 118 is configured to facilitate translation of extruded uncured tread strips from the extruder 112 and to uncured tread strip handling assembly 120. Uncured tread strip handling assembly 120 is configured to transport the first uncured tread strip from a tread strip extruder 112 and to a tread strip mold member 130.

Figure 4:
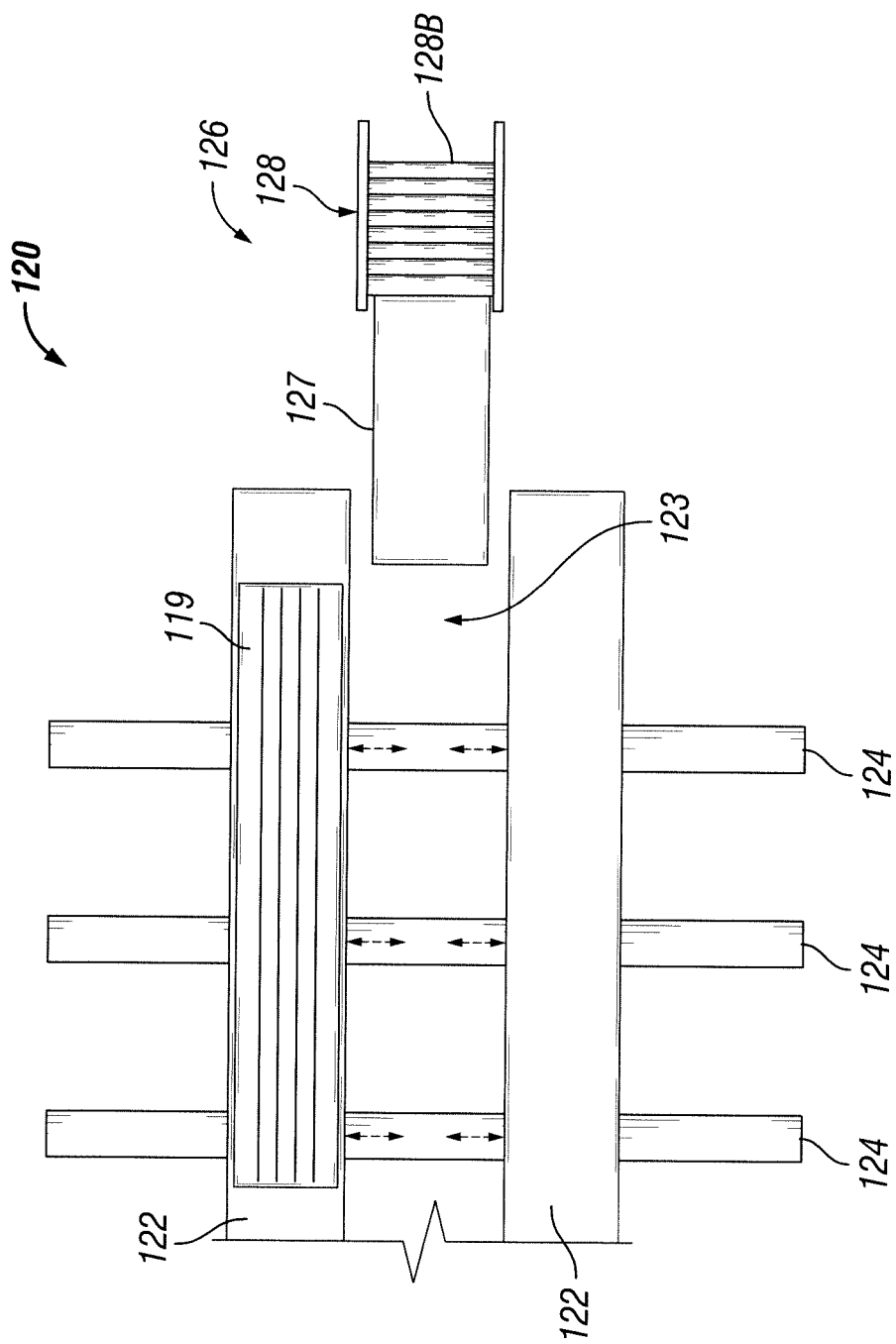
FIG. 4 is a partial top view of the tread strip handling assembly of FIG. 3, in accordance with an exemplary embodiment of the invention.

FIG. 4 more closely illustrates an exemplary an uncured tread strip handling assembly 120. Tread strip handling assembly 120 can be operative with a plurality of other functional subcomponents. For example, FIG. 4 depicts tread strip storage member 122 configured to both receive uncured tread strips 119 from extruder 112 and supply the uncured tread strips for loading into a tread strip mold member 130. In the embodiment shown, a conveyor transfers the extruded tread strips from the extruder assembly and to a tread strip mold member. More specifically, first and second tread strips are received from first and second conveyors, respectively. The conveyor comprises a pair of tread strip storage members 122 each configured to receive one of the first and second tread strips from the extruder assembly. Each tread strip storage member articulates between a tread strip receiving position and a tread strip discharging position, such that tread strip storage member 122 is configured to receive uncured tread strips from extruder 112 in the tread strip receiving position and such that tread strip storage member 122 is configured to transfer the first uncured tread strip to an inverting unit 126 in the tread strip discharging position. It can be said that in the discharging position, tread strip storage member 122 is separated from communication with extruder assembly 110. In the embodiment shown, two (2) tread strip storage members 122 are shown in a tread strip receiving position, where the tread strip discharging position for each tread strip storage member is arranged between the pair of tread strip storage members at a location 123 in operable communication with inverting unit 126. When separated and disconnected from communication with the extruder, each tread strip storage member is unable to receive any extruded tread strip from the extruder. It is appreciated that tread storage members may comprise any known conveyor capable of translating a tread strip along a length of the tread storage member from the extruder and to the inverting unit. A plurality of articulation members 124 are shown configured to articulate any one or both tread strip storage members 122 between a tread strip receiving position and a tread strip discharging position. It is appreciated that articulation members may each comprise any actuator or driven conveyor known to one of ordinary skill.

With reference again to FIG. 3, an inverting unit 126 is shown in operable communication with articulating tread strip storage members 122. Inverting unit 126 is configured to convey uncured tread strips from the tread strip storage members at an upper elevation to a lower elevation, where at the lower elevation the tread is inverted such that a bottom side of the tread strip at the upper elevation is arranged inverted to facing upwards at the lower elevation. In embodiments where inverting unit 126 is used, uncured tread strips are in a first arrangement when arranged at the upper elevation and a second arrangement when arranged at a lower elevation, where in second arrangement is inverted relative to the first arrangement. In the embodiment shown, inverting unit includes a first conveyor 127 and an inverting unit 128 comprising a first arcuate conveyor 128A spaced apart from a second arcuate conveyor 128B, each comprising a plurality of rollers and defining an arcuate translation path for a tread strip 119. The inverting unit 126 also operates as a tread strip application device configured to arrange uncured tread strips 119 along a tread strip mold member 130 arranged at the lower elevation below the inverting unit 126. In the alternative, the inverting unit may transfer an uncured, extruded tread strip to a tread strip application device configured to arrange any such tread strip along a tread strip mold member. By inverting the tread from the extruded arrangement, space may be more efficiently conserved. In other variations, any extruder may extrude a tread in an arrangement for application to the tread strip mold member without inverting the tread prior to mold member application. Regardless as to the application of the tread strip, in particular embodiments, the tread strip is clamped to the mold member, such as is exemplary shown using a clamp 139 at an upstream or leading end of the mold member.

It is appreciated that a FIG. 3 also illustrates a fabric application unit 129 arranged in association with the tread strip handling assembly 120 and configured to apply a fabric along an uncured tread strip prior to, concurrently with, or after application of the tread strip along tread strip mold member 130. Fabric is known to be applied to and cured with uncured tread strips, where the fabric is later removed prior to applying the tread to a tire carcass during retreading operations. Any know fabric suitable for this purpose may be used and applied in any known manner using any known apparatus. In the exemplary embodiment shown, a roll of fabric 129 is arranged near the lower portion of the inverting unit 128 or along the return assembly track 178. Application of the fabric may occur manually or be automated.

Figure 5:
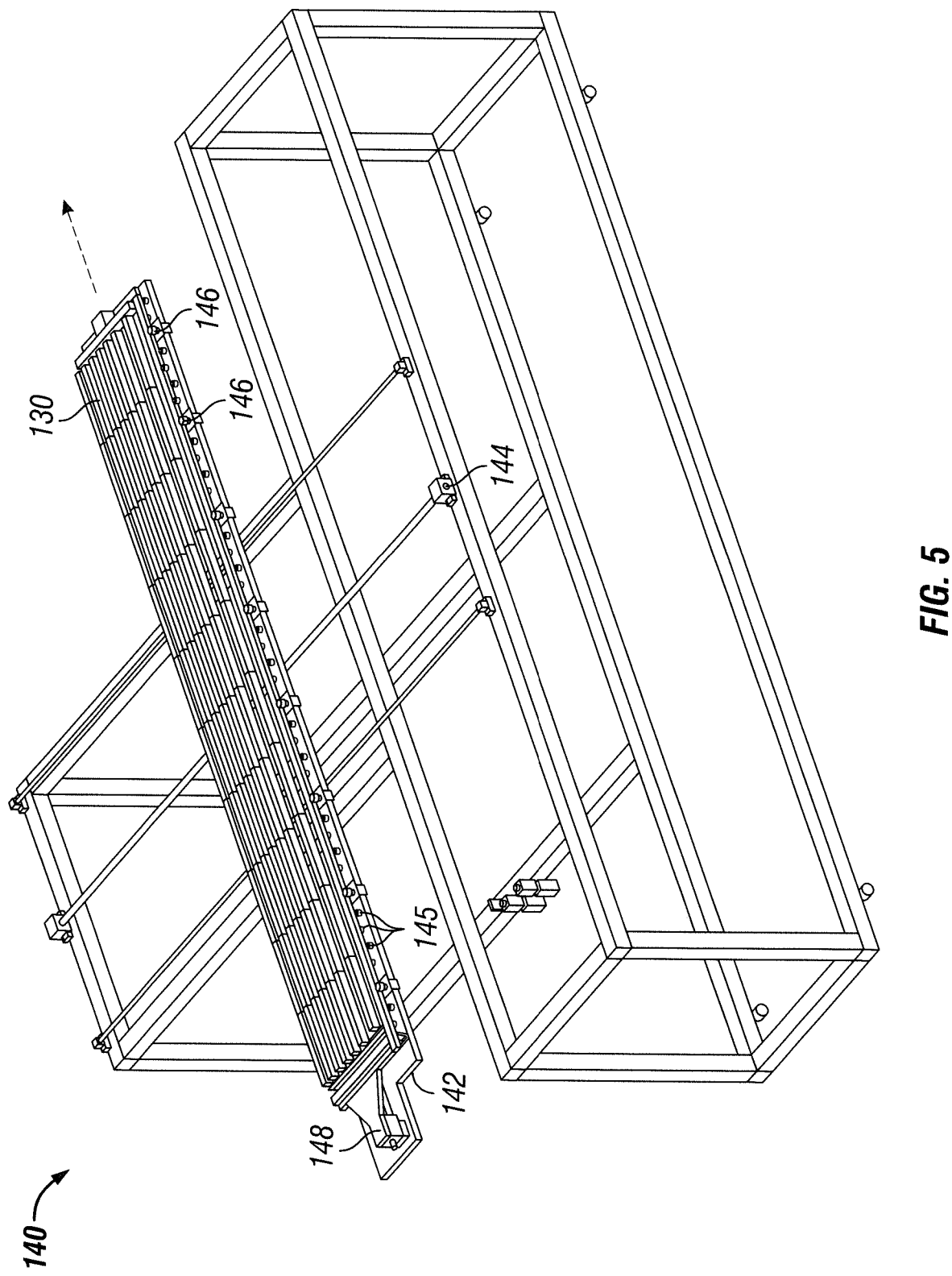
FIG. 5 is a perspective view of a pre-cure mold handling assembly of the closed-loop tread strip forming unit shown in FIG. 1, in accordance with an exemplary embodiment of the invention.

After an uncured tread strip is loaded onto a tread strip mold member, the loaded tread strip mold member is transferred to a pre-cure mold handling assembly, as shown in an exemplary embodiment in FIG. 5 as reference numeral 140. This transfer may occur manually or mechanically using an actuator or known manner. Pre-cure mold handling assembly 140 conveys a loaded tread strip mold member 130 into an inlet 152 of the curing press 150 (see FIG. 6). In the exemplary embodiment, the loaded tread strip mold member 130 is arranged along a ball tray (or table) 142 that includes a plurality of ball bearings 145 that support the mold member and freely rotate to facilitate low friction translation of the tread strip mold member along the tray and into the curing press. Lateral guides 146 are used to control the lateral position of the mold member along the tray. One or more translation members 144 comprising actuators are used to translate tray 142 from communication with the track 178 and the tread strip handling assembly 120 to a mold loading position. Once in the mold loading position, a loading actuator 148 translates the tread strip mold member 130 along a length of the tray 142 and into the curing press, whereby pre-cure mold handling assembly operates as a mold loader. Once the curing operation has concluded for any loaded tread strip mold member, in the exemplary embodiment shown, the loading actuator operates as an unloading actuator and extends into the curing press inlet to push the mold member outward from the press outlet and into the post-cure mold handling assembly, whereby pre-cure mold handling assembly operates as a mold unloader. Any translation member may comprise any actuator or driven conveyor, or any other device configured to transfer or translate a target object. In other embodiments, however, a mold unloader may be arranged adjacent the curing press outlet to unload any tread strip mold member from the curing press after a curing operation has concluded. It is appreciated that the mold unloader may be separate from or integrated with the post-cure mold handling assembly.

Figure 6:
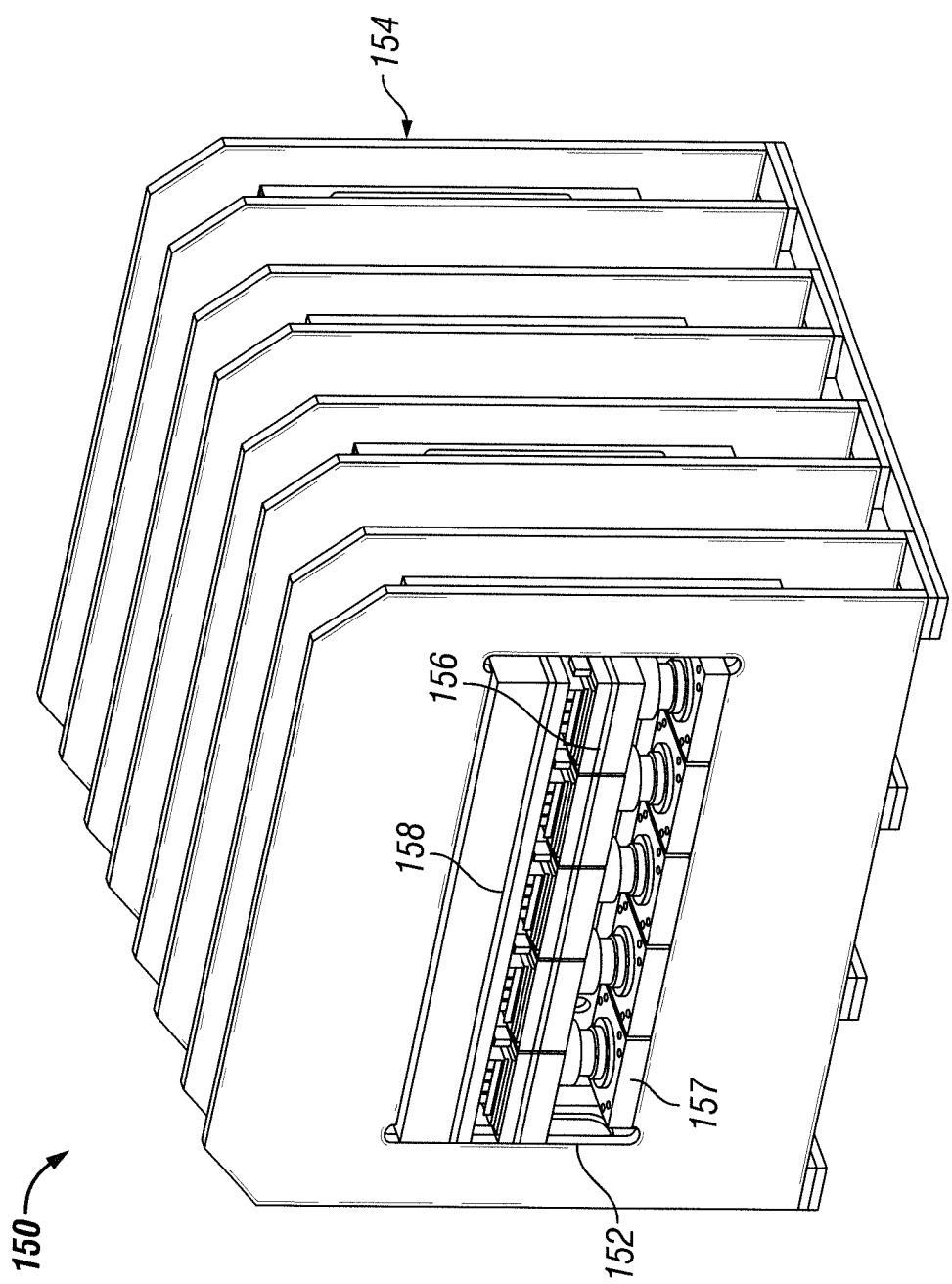
FIG. 6 is a perspective view of a curing press of the closed-loop tread strip forming unit shown in FIG. 1, in accordance with an exemplary embodiment of the invention.

FIG. 6 illustrates curing press 150 of closed-loop tread strip forming unit 100. Curing press 150 has a plurality of pairs of opposing platens 156, 158. In particular, each pair includes a top platen 158 common to all pairs and one of a plurality of lower platens 156. Each pair of opposing platens 156, 158 are displaceable between open and closed arrangements. Curing press 150 also has an inlet 152 configured to receive a tread strip mold member loaded with an uncured tread strip and an outlet 154 configured to discharge the tread strip mold member loaded with a cured tread strip produced from the uncured tread strip after undergoing a curing process within the curing press. While each pair of opposing platens 156, 158 are described as displaceable between open and closed arrangements, while either or both platens may articulate, in particular embodiments, such as the embodiment shown, only one platen of each pair of platens 156, 158 articulates or moves such that the other one of each pair of platens is fixed. It is appreciated that any quantity of platens pairs can be provided in a curing press. For example, alternative embodiments may have one, two, three, four, five, or more pairs of platens. For example, the pairs of platens are arranged in a side-by-side relationship. An exemplarily variation of the embodiment shown having five (5) pairs of platens provides three (3) pairs of platens. To articulate any platen, a curing press includes one or more drive assemblies. In the embodiment shown, curing press 150 includes a drive assembly 157 to articulate each platen 156. A drive assembly may comprise any known manner for articulating using any known device.

A curing process is governed by a curing law, which includes curing parameters for operating the curing press 150. Depending on the tread strip material and tread strip design, for any curing process, the tread strip is exposed to particular temperatures and pressures at particular instances for particular durations. And when multiple pairs of platens are provided, different curing operations and curing laws may be employed for each of the different pairs of platens. Curing laws can include various cycles and "bumps," which comprise a brief opening and subsequent re-closing of the mold during curing operations to facilitate removal of gases generated during the curing process within each mold, which is referred to as degassing.

One advantage of the exemplary tread forming unit is that curing press 150 is utilized exclusively for curing, thereby maximizing press productivity, where tread demolding occurs outside the curing press after the tread strip mold member is removed from the press.

Upon completion of a curing operation, as noted above, the loaded tread strip molding member is discharged from the curing press through an outlet of the curing press. Upon discharge, the loaded tread strip molding member is received by a post-cure mold handling assembly. In an exemplary embodiment shown in FIG. 7, a post-cure handling assembly 160 of the tread forming unit 100 in FIG. 1 is shown in further detail. Subsequent to being received by post-cure handling assembly 160, a loaded tread strip mold member 130 is able to cool at least partially until being transferred to a return assembly 170 for demolding of the tread strip and return of the unloaded tread strip mold member to the pre-cure end 102 and the uncured tread strip handling assembly 120 to close the closed-loop system for reuse. In the embodiment shown, post-cure handling assembly 160 includes a ball table 162 for receiving the loaded tread strip molding member from the curing press. The ball table 162 operates as a conveyor by including ball bearings 163 configured to freely rotate in any direction, such that the ball table is configured to move the tread strip mold member in any direction, including in a direction towards the return assembly 170. While the ball table 162 may extend to a return assembly, in the embodiment shown, a roller table 164 is provided including a plurality of rollers 165 better control the translation of the tread strip mold member by limiting the transfer direction to the direction of rotation of the rollers and towards the return assembly 170. It can be said that the roller table defines a linear or single direction of travel, but the direction of travel may extend along any linear or non-linear path. It is appreciated that the post-cure assembly may comprise any known manner for conveying the tread strip mold member from the curing press and to the return assembly using any known apparatus, such as any conveyor, whether or not driven, as contemplated herein. In the exemplary embodiment shown, a transfer mechanism 166 is coupled to an actuator 168 to convey a discharged mold member along the table 162 and towards the return assembly 170. It is appreciated that the post-cure handling assembly and the return assembly may comprise the same assembly.

Figure 7:
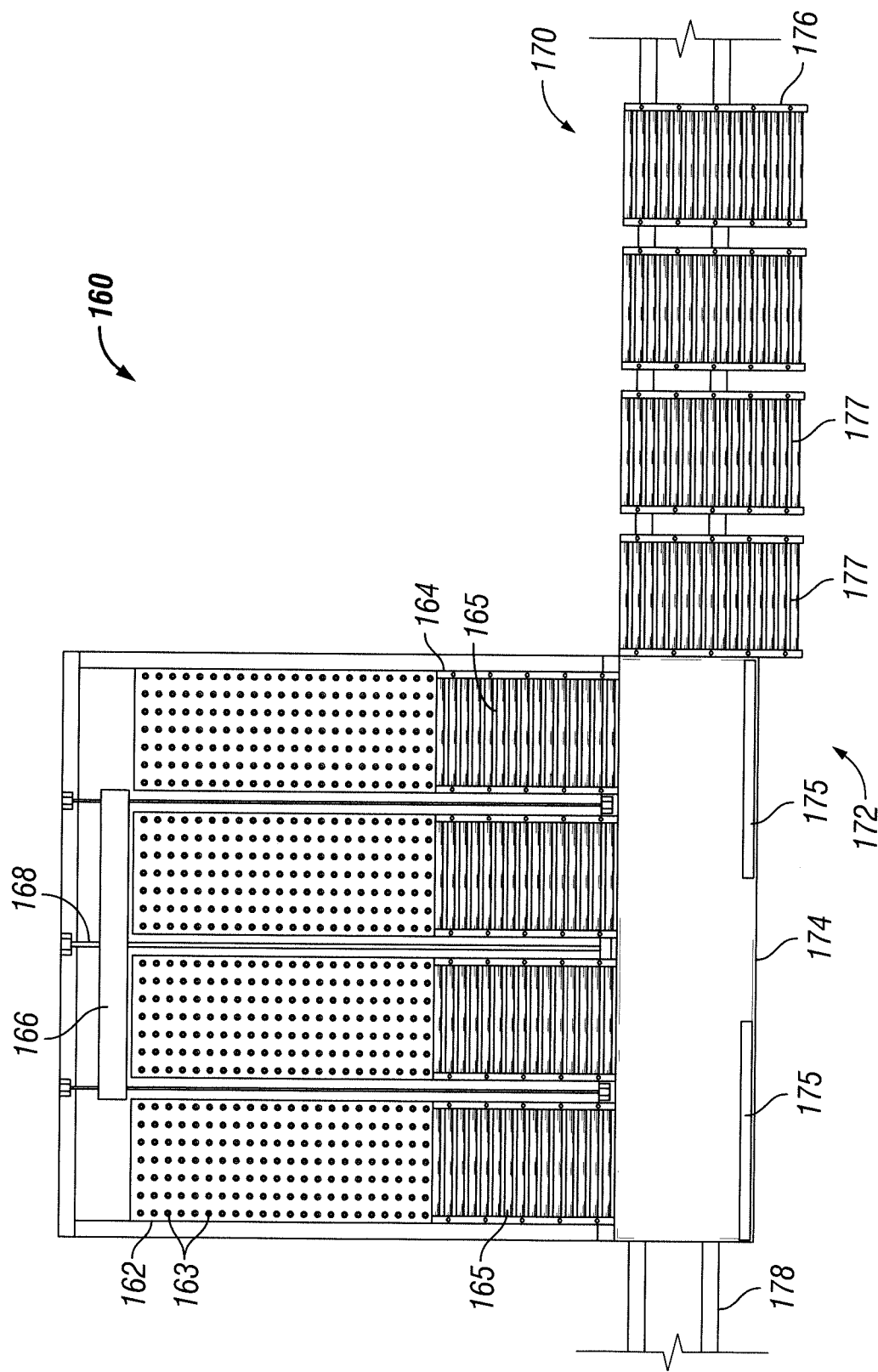
FIG. 7 is a top view of a post-cure mold handling assembly of the closed-loop tread strip forming unit shown in FIG. 1, in accordance with an exemplary embodiment of the invention.
Figure 8:
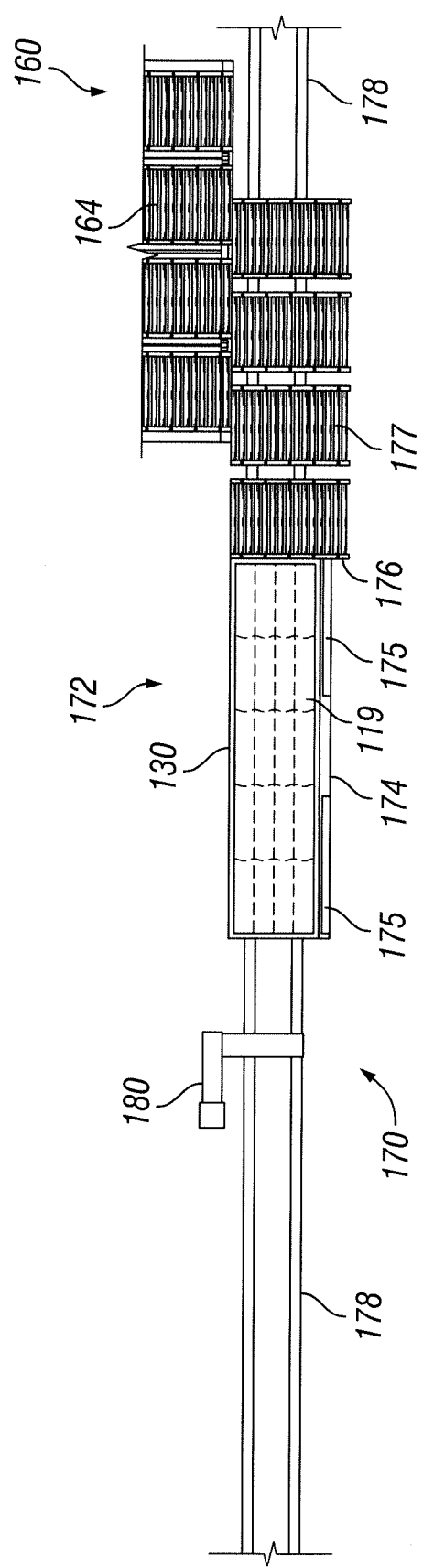
FIG. 8 is perspective view of a return assembly of the closed-loop tread strip forming unit shown in FIG. 1, in accordance with an exemplary embodiment of the invention.

With reference to FIGS. 7 and 8, return assembly 170 is configured to transfer tread strip mold members 130 from post-cure end 104 of closed-loop tread strip forming unit 100 to pre-cure end 102 of closed-loop tread strip forming unit 100. In embodiments, a conveyor 172 receives a loaded tread strip mold member 130 from post-cure handling assembly 160. Conveyor 172 specifically includes a mold member retention portion 174 having one or more optional stops 175 for maintaining a position of the tread strip mold member upon receipt from the post-cure mold handling assembly 160. Conveyor 172 also includes a tread discharging unit 176 located behind or upstream the mold member retention portion 174 relative a direction of travel towards the pre-cure end 102. The tread strip discharge unit 176 includes a plurality of rollers 177 for directing a demolded tread 119 from unit 100 after being demolded from a tread strip mold member 130. In the embodiment shown, tread discharging unit 176 is operably connected to the mold member retention portion 174, although in other variations, each is separate and detached even though both may be translated together. Conveyor 172 translates along track 178 by any known manner using any known apparatus for translating. Track 178 extends to the uncured tread strip handling assembly 120 and optionally to the pre-cure mold handling assembly 140. While conveyor 172 extends along a linear path, it is appreciated that the conveyor may define a direction of travel extending along any linear or non-linear path.

With reference to FIG. 8, a tread strip demolding device 180 is arranged along track 178 between the post-cure handling assembly 160 and uncured tread strip handling assembly 120. Demolding device 180 is configured to remove a cured tread strip from each tread strip mold member 130 as the mold member is being returned to the pre-cure end 102.

Figure 9A:
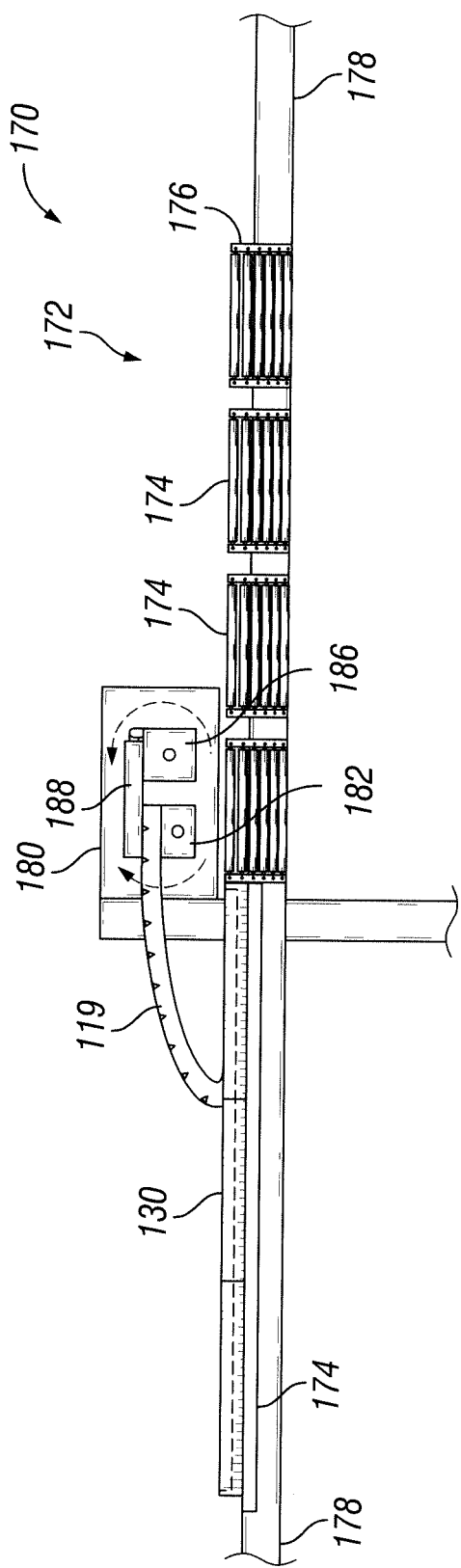
FIG. 9A is partial side view of the return assembly and a tread demolding device of the closed-loop tread strip forming unit shown in FIG. 1, in accordance with an exemplary embodiment of the invention, where the demolding device is in the process of demolding a cured tread from a mold member.
Figure 9B:
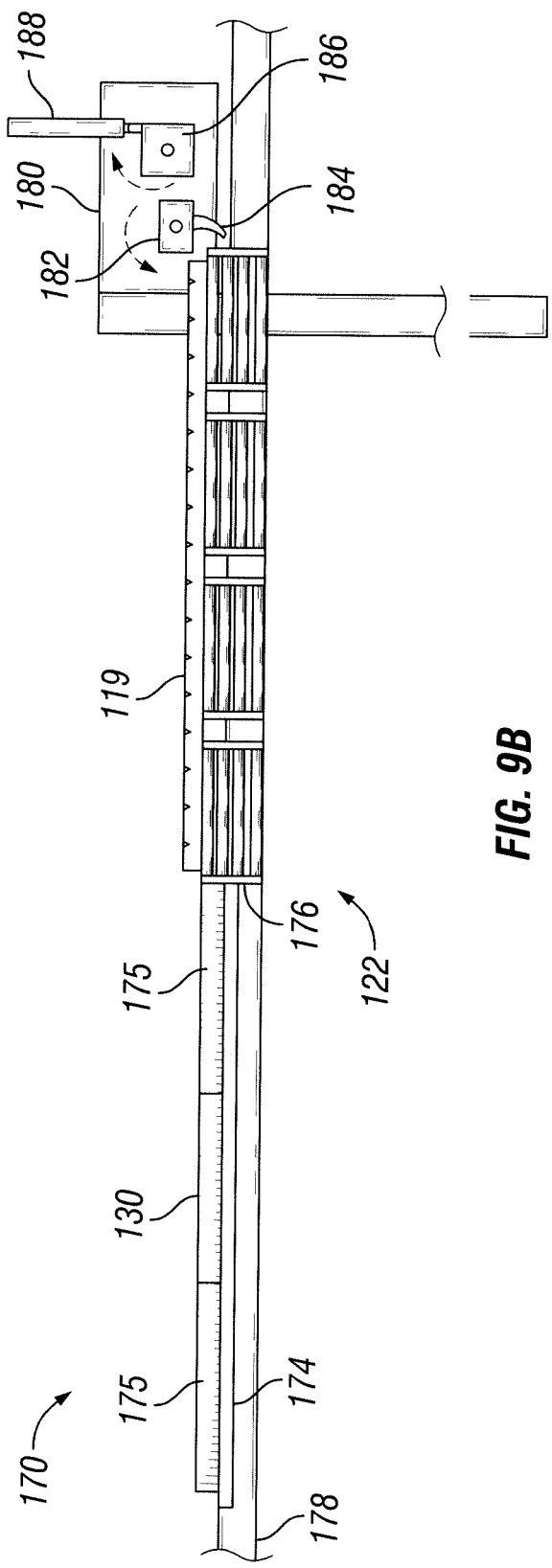
FIG. 9B is partial side view of the return assembly and a tread demolding device of the closed-loop tread strip forming unit shown in FIG. 9A, in accordance with an exemplary embodiment of the invention, where the cured tread is fully demolded and arranged along a tread discharge unit.

It is appreciated that any known demolding device may be employed. In the embodiment shown in FIG. 9A, demolding device 180 includes a rotatable gripping member 182 and a rotatable clamping member 186 for grasping and retaining an upstream end of a tread strip. By securely retaining the upstream end of the tread strip, the tread is pulled from the tread strip mold member 130 as it translates by the demolding device 180 along track 178. Clamping member 186 includes a clamping structure 188 that rotates to squeeze and secure the tread strip against the gripping member. One or more projections 184 (see FIG. 9B) extend from the gripping member 182 to initially grasp the tread strip arranged within the mold member 130. In FIG. 9A, the tread is secured within the demolding device 180 as the tread strip 119 is being demolded. As the mold member 130 passes under the demolding device 180, gripping member 182 rotates clockwise to hook the tread strip with the one or more projections 184 and continues to wrap the tread strip partially around the gripping member. Subsequently, the clamping member 186 rotates counterclockwise to secure the tread strip with the clamping structure 188. With reference to FIG. 9B, after the tread strip is demolded, rotation is first reversed for clamping member 186 and then reversed for the gripping member 182 to release the tread strip from the demolding device 180. Because the tread strip discharge unit 176 follows the tread strip molding member 130, the demolded tread 119 is dropped onto the discharging unit, which transfers the demolded tread strip from the return assembly 170 and ultimately from the tread strip forming unit 100. It is appreciated that the tread strip mold member 130 may optionally remain in the conveyor 172 until the mold member is loaded and transferred to the pre-cure mold handling assembly 140.

It is appreciated in view of the disclosure including the figures that aspects presented in singular can be employed in plural in various embodiments. For example, varying numbers of extruders, storage members, conveyors, loaders, platens, et cetera can be utilized in different embodiments without departing from the scope or spirit of the innovation. Each assembly discussed above in the closed-loop unit, including the extruder assembly, the uncured tread strip handling assembly, the pre-cure mold handling assembly, the curing press, the post-cure mold handling assembly, the return assembly, and the demolding device may each be modular in whole or in part to facilitate easy assembly, disassembly, reconfiguration, and shipment of the closed-loop unit.

The terms "comprising," "including," and "having," as used in the claims and specification herein, shall be considered as indicating an open group that may include other elements not specified. The terms "a," "an," and the singular forms of words shall be taken to include the plural form of the same words, such that the terms mean that one or more of something is provided. The terms "at least one" and "one or more" are used interchangeably. The term "single" shall be used to indicate that one and only one of something is intended. Similarly, other specific integer values, such as "two," are used when a specific number of things is intended. The terms "preferably," "preferred," "prefer," "optionally," "may," and similar terms are used to indicate that an item, condition or step being referred to is an optional (i.e., not required) feature of the invention. Ranges that are described as being "between a and b" are inclusive of the values for "a" and "b" unless otherwise specified.

While this invention has been described with reference to particular embodiments thereof, it shall be understood that such description is by way of illustration only and should not be construed as limiting the scope of the claimed invention. Accordingly, the scope and content of the invention are to be defined only by the terms of the following claims. Furthermore, it is understood that the features of any specific embodiment discussed herein may be combined with one or more features of any one or more embodiments otherwise discussed or contemplated herein unless otherwise stated.

What is claimed is:

1. A closed-loop tread strip forming unit, comprising:
a first tread strip extruder configured to extrude a first uncured tread strip having a length extending between a first tread strip end and a second tread strip end, the first tread strip extruder located at a pre-cure end of the closed-loop tread strip forming unit;
an uncured tread strip handling assembly configured to transport the first uncured tread strip from the first tread strip extruder and to a first tread strip mold member;
a curing press having a pair of opposing platens, the pair of opposing platens displaceable between open and closed arrangements;
the curing press having an inlet configured to receive the first tread strip mold member with the first uncured tread strip and an outlet configured to discharge the first tread strip mold member with a first cured tread strip produced from the first uncured tread strip using a curing process within the curing press;
a pre-cure mold handling assembly configured to both receive the first tread strip mold member containing the first uncured tread strip from the uncured tread strip handling assembly and insert the first tread strip mold member containing the first uncured tread strip into the curing press through the inlet for arrangement between the pair of opposing platens;
a post-cure mold handling assembly configured to receive the first tread strip mold member from the outlet of the curing press, the first tread strip mold member containing the first uncured tread strip in a cured state, the post-cure mold handling assembly configured to transfer the first tread strip mold member with the first cured tread strip to a return assembly, the return assembly configured to transfer the first tread strip mold member from a post-cure end to the pre-cure end to form a closed-loop about the closed-loop tread strip forming unit, a tread strip demolding device configured to remove the first cured tread strip from the first tread strip mold member unloaded from the curing press.

2. The closed-loop tread strip forming unit of claim 1, where the first tread strip extruder is configured to extrude a heated tread strip, and where the uncured tread strip handling assembly and the pre-cure mold handling assembly are configured such that the first uncured tread strip is inserted into the curing press while in a heated state.

3. The closed-loop tread strip forming unit of claim 1, where the uncured tread strip handling assembly includes:
 a conveyor configured to translate the first uncured tread strip received from the first tread strip extruder and to a location for application to the first tread strip mold member.

4. The closed-loop tread strip forming unit of claim 1, further comprising:
 a second tread strip extruder configured to extrude a second uncured tread strip having a second tread strip length extending between opposing ends,
 where the uncured tread strip handling assembly is configured to transport the second uncured tread strip from the second tread strip extruder and to a second tread strip mold member.

5. The closed-loop tread strip forming unit of claim 4, where the uncured tread strip handling assembly includes:
 a first tread strip storage member configured both to receive the first uncured tread strip from the first tread strip extruder and to supply the first uncured tread strip to the conveyor;
 a second tread strip storage member configured to both receive the second uncured tread strip from the second extruder and to supply the second uncured tread strip to the conveyor,
 where the first tread strip storage member articulates between a first tread strip receiving position and a first tread strip discharging position, such that in the first tread strip receiving position the first tread strip storage member is configured to receive the first uncured tread strip from the first tread strip extruder and in the first tread strip discharging position the first tread strip storage member is configured to transfer the first uncured tread strip to the conveyor, where in the first discharging position the first tread strip storage member is separated from communication with the first tread strip extruder,
 where the second tread strip storage member articulates between a second tread strip receiving position and a second tread strip discharging position, such that in the second tread strip receiving position the second tread strip storage member is configured to receive the second uncured tread strip from the second tread strip extruder and in the second tread strip discharging position the second tread strip storage member is configured to transfer the second uncured tread strip to the conveyor, where in the second discharging position the second tread strip storage member is separated from communication with the second tread strip extruder.

6. The closed-loop tread strip forming unit of claim 4, where the first and second tread strip mold members are of different designs for forming different tread strip designs.

7. The closed-loop tread strip forming unit of claim 3, where the uncured tread strip handling assembly further includes an inverting unit, the inverting unit configured to convey the first uncured tread strip between an upper elevation and a lower elevation, where the first uncured tread strip is in a first arrangement when arranged at the upper elevation and where the first uncured tread strip is in a second arrangement when arranged at the lower elevation, where the first uncured tread strip in the first arrangement is inverted relative to the first uncured tread strip in the second arrangement.

8. The closed-loop tread strip forming unit of claim 7, where the location for applying the first uncured tread strip to the tread strip mold member is at the lower elevation of the inverting unit.

9. The closed-loop tread strip forming unit of claim 3, where the uncured tread handling assembly includes a fabric application unit configured to apply a fabric to the first uncured tread strip.

10. The closed-loop tread strip forming unit of claim 1, further comprising a tread strip discharging unit configured to receive and transfer the first cured tread strip from the tread strip demolding device.

11. The closed-loop tread strip forming unit of claim 10, where the tread strip discharging unit is attached to a conveyor including a mold member-receiving portion configured to receive the tread strip mold member from the post-cure mold handling assembly.

12. The closed-loop tread strip forming unit of claim 1, where each end of the first tread strip mold member includes a cutting element at each of both opposing ends of the first tread strip mold member.

13. The closed-loop tread strip forming unit of claim 1, where a length of the first tread strip mold member is configured to form multiple tire treads.

14. The closed-loop tread strip forming unit of claim 1, further comprising one or more additional platens arranged adjacent to one of the pair of opposing platens.

15. A method for forming tire tread strips using a closed-loop tread strip forming unit, comprising:
 extruding an uncured tread strip using an extruder, the uncured tread strip having a length extending between a first tread strip end and a second tread strip end, where the extruding occurs at a pre-cure end of the closed-loop tread strip forming unit;
 transporting the uncured tread strip to a tread strip mold member contained within the closed-loop tread strip forming unit;
 arranging the uncured tread strip along the tread strip mold member to form a loaded tread strip mold member;
 inserting the loaded tread strip mold member into a curing press contained within the closed-loop tread strip forming unit through an inlet of the curing press, the curing press having at least a pair of opposing platens;
 articulating at least one platen of the curing press to close the curing press with the tread strip mold member aligned between the pair of opposing platens;
 curing the uncured tread strip in the tread strip mold member to provide a cured tread strip;
 discharging the loaded tread strip mold member from the curing press through an outlet of the curing press;

transferring the loaded tread strip mold member including the cured tread strip to a return assembly contained within the closed-loop tread strip forming unit;

demolding the cured tread strip from the loaded tread mold member subsequent to the step of discharging; and conveying the tread strip mold member to the pre-cure end after the cured tread strip has been demolded.

16. The method of claim 15, further comprising inverting the uncured tread strip before applying the uncured tread strip to the tread strip mold member, where the step of inverting is accomplished using an inverting unit which directs the uncured tread strip around an arcuate path.

17. The method of claim 15, further comprising articulating a second platen of the curing press while the at least one platen is in a closed configuration, where a second tread strip mold member including a second uncured tread band is aligned with the second platen in the curing press prior to articulating at least the second platen.

18. The method of claim 15, where the uncured tread strip is extruded in a heated state, and where loading the tread strip mold member including the uncured tread strip into the curing press occurs while the uncured tread strip is in the heated state.

19. The method of claim 15, where the tread strip mold member is located on a return conveyor while performing the step of demolding.

20. The method of claim 15, further comprising cutting the cured tread strip into a plurality of tire treads.

* * * * *